(12) United States Patent (10) Patent No.: US 12,651,067 B2

Sarab et al. (45) Date of Patent: Jun. 9, 2026

(54) ACCESS TO SECOND- AND THIRD-PARTY RESOURCES IN CONTROLLED EXAM ENVIRONMENTS

(71) Applicants: Greg N. Sarab, Half Moon Bay, CA (US); Alexa J. Fanti, Reisterstown, MD (US)

(72) Inventors: Greg N. Sarab, Half Moon Bay, CA (US); Alexa J. Fanti, Reisterstown, MD (US)

(73) Assignee: Extegrity, Incorporated, Half Moon Bay, CA (US)

( * ) Notice: Subject to any disclaimer, the term of this patent is extended or adjusted under 35 U.S.C. 154(b) by 61 days.

(21) Appl. No.: 18/649,966

(22) Filed: Apr. 29, 2024

(65) Prior Publication Data

US 2024/0362333 A1 Oct. 31, 2024

Related U.S. Application Data

(60) Provisional application No. 63/462,335, filed on Apr. 27, 2023.

(51) Int. Cl.
*G06F 21/57* (2013.01)
*G06F 21/62* (2013.01)

(52) U.S. Cl.
CPC .......... *G06F 21/57* (2013.01); *G06F 21/6218* (2013.01)

(58) Field of Classification Search
CPC ............................ G06F 21/57; G06F 21/6218
See application file for complete search history.

(56) References Cited

U.S. PATENT DOCUMENTS

| | | | | |
|---|---|---|---|---|
| 2013/0198833 A1* | 8/2013 | Winneg | ................. | G06F 21/52 |
| | | | | 726/16 |
| 2014/0272882 A1* | 9/2014 | Kaufman | .............. | G09B 5/065 |
| | | | | 434/308 |

* cited by examiner

*Primary Examiner* — Beemnet W Dada
(74) *Attorney, Agent, or Firm* — Jeffery Frazier

(57) ABSTRACT

Secure examination software, systems, and methods for allowing examinees access to specified external electronic document resources stored on one or more remote internet-connected servers during an examination event. In various embodiments, the secure examination software program comprises (a) a secure examination-taking component and (b) a secure web browser component. In various embodiments, the secure web browser component in the secure exam software interface allows access only to specified electronic resources stored on internet-connected servers, while access to all other electronic resources is blocked or otherwise prohibited.

5 Claims, 2 Drawing Sheets

ACCESS TO SECOND- AND THIRD-PARTY RESOURCES IN CONTROLLED EXAM ENVIRONMENTS

RELATED APPLICATIONS

The present application claims priority to U.S. Provisional Patent Application No. 63/462,335 filed on Apr. 27, 2023; which application is incorporated herein by reference.

FIELD

The present teachings relate to computer-based knowledge and/or practical examinations given in controlled environments, and more particularly to open book examinations wherein one or more source or reference materials are made available to examinees when taking such examinations.

INTRODUCTION

In so called "open book" exams, academic institutions and other examining bodies allow access to supplemental resources by examinees during exams. Examples of such resources include documentary course materials of varying lengths, from short excerpts of various writings up to entire textbooks, and may also include one or more other kinds of written, audio, image, video, or other materials.

Certain higher-stakes exams, such as in law schools, are administered in controlled environments and require examinees to produce their answers using dedicated software which controls both access to materials on their computers and access to external resources via network connections.

Extegrity Incorporated (Half Moon Bay, CA) makes and markets high-stakes exam software solutions, including exam software used in commerce under the trade name EXAM4™. EXAM4™ exam software (Extegrity Incorporated (Half Moon Bay, CA)) offers a method for instructors and exam administrators to allow examinees access to specified local electronic reference materials and resources, such as PDF documents, stored on an institution-controlled local drive or server.

While local access to electronic reference materials and resources can be useful in certain testing situations, exam administrators generally desire to increase the envelope of supplemental resource types made available to examinees, and especially to add access to remote (i.e., non-local) online resources.

SUMMARY

An exemplary and non-limiting summary of various embodiments is set forth next.

Various aspects of the present teachings provide a system for securing a computing device during an open book testing event, comprising: (1) a secure examination software program, comprising: (a) an examination-taking component, and (b) a web browser component; wherein the web browser component is configured: (i) to locate and fetch a user-selected authorized reference work from one or more authorized reference work libraries hosted on one or more remote internet-connected servers; and (ii) to render the contents of the fetched authorized reference work on a display of the computing device in a GUI window; and, (2) a network access control module configured to block all network traffic to or from the computing device during the testing event, except for that recited in (1) (b) above.

According to various embodiments, the secure examination software program is embodied on a non-transitory computer-readable storage medium.

According to various embodiments, the secure examination software program is hosted on an internet-connected server for downloading over a network onto the computing device of a user/examinee.

Further aspects of the present teachings provide a secure examination software program for use on a computing device, such as a laptop computer, comprising, (a) a secure examination-taking component and (b) a secure web browser component, wherein the secure web browser component is configured (i) to locate and fetch/retrieve a user-selected reference work from one or more online reference libraries hosted on one or more remote internet-connected servers, with the reference work being stored in a specified electronic format; and (ii) to render the fetched reference work on a display of the computing device in a GUI window generated by the secure web browser component.

In various embodiments, the secure examination software program is digitally packaged for delivery by a software developer or examining authority (e.g., state bar) to one or more users (e.g., examinees) over a network, such a LAN, WAN, the Internet, and the like.

As contemplated herein, generally, two related methods, and permutations thereof, are provided to allow examinees access to specified external document resources stored on a server controlled: by an exam software developer/marketer; or by a second-party (institution administering exams) resource owner, such as a school; or by a third-party (exam administrator's supplier) resource owner, such as a textbook publisher. Whereas various embodiments of the methods are applicable to a wide array of document types, this application will refer: generally to "documents"; to "course materials" as an example of a second-party document type; and to "textbooks" as an example of a third-party document type. In certain embodiments or modes of use, methods and systems of the present teachings can be used to supplement or to replace the existing PDF delivery method noted above, which may be advantageous in scenarios such as where a large number of resources are to be made available by the examining institution.

Common to both methods, according to various embodiments, is a web browser component in the exam software interface that allows access to specified resources stored on servers controlled by any participating party. As discussed in detail below, notable differences between the two methods relate to where, how, and by which party the resources are formatted, stored and served.

According to various embodiments, the two methods handle resources as either:

1) "distributed resources", where all aspects are the responsibility of the resource owner or holder; or 2) "consolidated resources", where delivery by the second- and/or third-party to the software developer and/or the second-party is the responsibility of the resource owner or holder, formatting may be the responsibility of any party, and storage and server operations are the responsibility of the software developer or the second-party.

Next, outline specification is described for key functions including document formatting, delivery to a repository server, URL formats, availability, and transmission to examinees. As described herein, methods and systems of the present teachings balance multiple interests, including: maximum reliability throughout the system; security and reporting for publishers; organizational costs for institutions; ease of use, uniformity and fairness for examinees; build and maintenance costs for the software developer; among others.

Other aspects and iterations of the present teachings are further described below.

DESCRIPTION OF VARIOUS EMBODIMENTS

Figure 1:
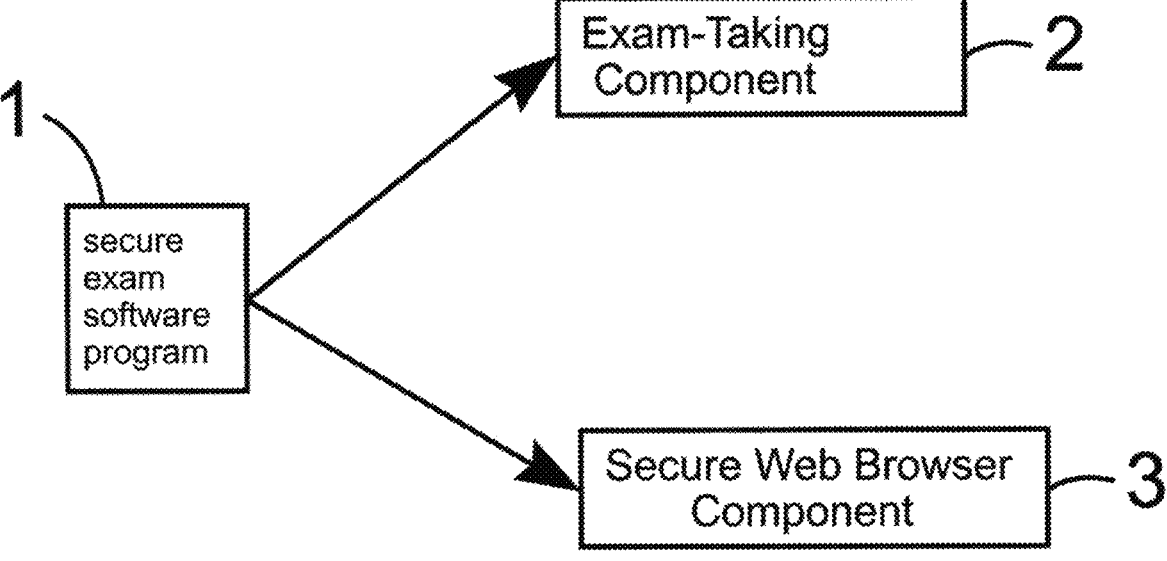
FIG. 1 depicts, in schematic form, a secure examination software program comprising an exam-taking component and a web browser component, according to various embodiments.

Reference will now be made to various embodiments. While the present teachings will be described in conjunction with various embodiments, it will be understood that they are not intended to limit the present teachings to those embodiments. On the contrary, the present teachings are intended to cover various alternatives, modifications, and equivalents, as will be appreciated by those of skill in the art.

According to various embodiments, aspects of the present teachings relate to computer-based knowledge and/or practical examinations (e.g., bar exams) given in controlled environments, and more particularly to open book examinations wherein one or more source or reference materials in electronic format are made available for viewing by examinees when taking such examinations. Further aspects of present teachings relate to computer-based examinations given in controlled environments, and more particularly to so-called "open-book" examinations, wherein one or more source or reference materials are made available for viewing by each examine on a respective test-taking computer systems (e.g., a laptop computer including a display device, such as an LED, LCD or OLED screen).

As discussed above, the examination location is controlled. In this regard, it is noted that the knowledge the skilled artisan imparts to the present teachings are more than adequate to control a location, as such term is used herein and understood in the art. See, for example the publication entitled, "MRGS Assessment Information for Students and Parents/Caregivers 2014" (incorporated herein by reference) which exemplifies, at least in part, the knowledge of the skilled artisan. For example, at pages 20-22 (under the heading, "APPENDIX—Procedures for Controlled Conditions") many aspects of a controlled room are described. As can be seen, the foregoing publication describes plural techniques, well-known to those skilled in the art, commonly employed for controlling a location.

According to various embodiments, one or more aspects of the present teachings are embodied in exam software, such as the exam software made and marketed in commerce under the trade name EXAM4™ by Extegrity Incorporated (Half Moon Bay, CA). In various embodiments, the present teachings can be employed with the exam software solutions described, for example, in U.S. Pat. No. 9,953,175, incorporated herein by reference; as well as in US Patent Application Nos. US20120066771, US20130219515, US20200279223, US20220067389, and US20230185539; each of which is incorporated herein by reference.

In general, various aspects of the present teachings provide a system for securing a computing device during an open book testing event, comprising: (1) a secure examination software program, comprising: (a) an examination-taking component, and (b) a web browser component; wherein the web browser component is configured: (i) to locate and fetch/retrieve a user-selected authorized reference work from one or more authorized reference work libraries hosted on one or more remote internet-connected servers; and (ii) to render the contents of the fetched authorized reference work on a display of the computing device in a GUI window; and, (2) a network access control module configured to block all network traffic to or from the computing device during the testing event, except for that recited in (1) (b) above.

Figure 2:
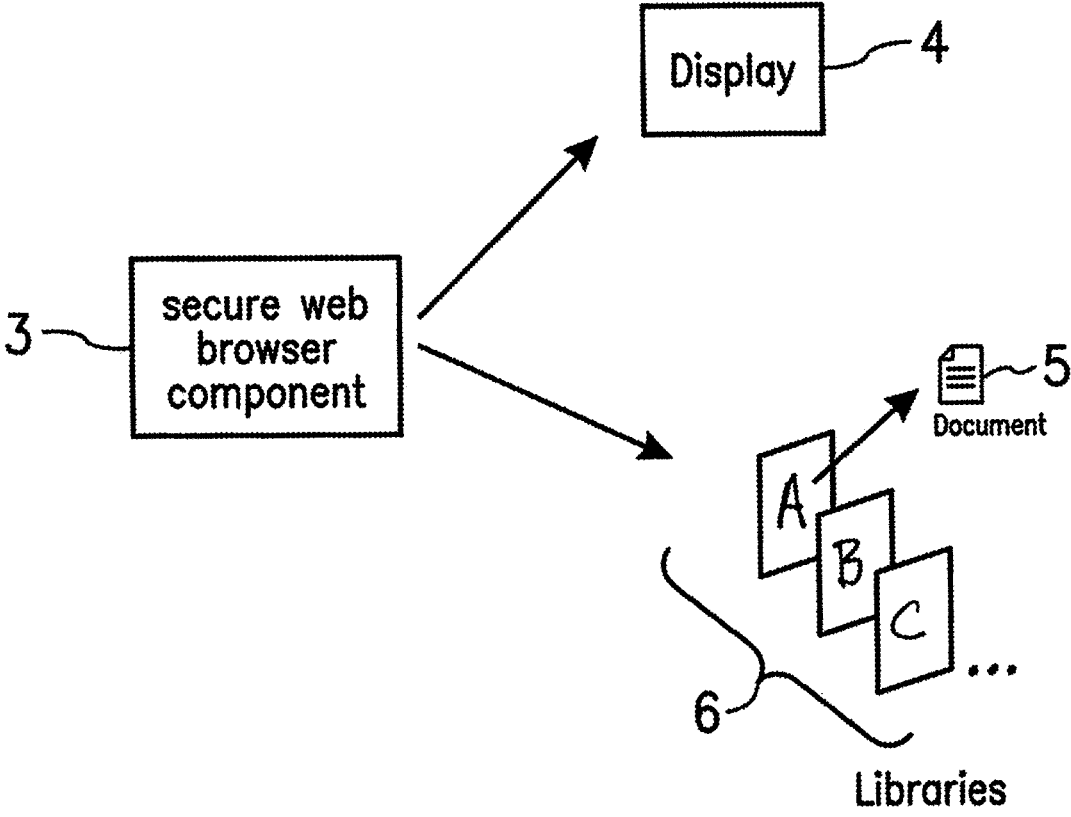
FIG. 2 depicts, in schematic form, the web browser of FIG. 1, as well as such browser's reference fetching and display functions; according to various embodiments.

Referring now to FIG. 1, in accordance with various embodiments, a secure examination software program 1, digitally packaged for electronic delivery over a network, can comprise an exam-taking module or component 2 and a web browser module or component 3. With additional reference to FIG. 2, the web browser module or component 3 can be configured for locating and fetching a selected electronic reference work, such as at 5, from one or more online libraries of electronic reference works 6 hosted on one or more remote internet-connected servers (not shown). The web browser can display the contents of the selected reference work to the user (examinee).

1. DISTRIBUTED RESOURCES a). URL Formatting

In accordance with various embodiments, the method leverages existing ebook delivery tools as typically operated by publishers, where the URLs for effectively all resources are organized in such a way that materials of the type expected to be allowed are segregated from materials and resources expected to be disallowed. In various embodiments, secure examination software of the present teachings maintains proper separation by utilizing "regular expressions" or "regexes" to determine which URLs should be accessible, and thereby only provide access to allowed materials. The specified regex parameters can be included in an "configuration/initialization file" or "INI" created for the secure examination software and electronically delivered to examinees by existing processes.

In one embodiment, where a publisher provides access to textbooks via a web application, the exam software developer and/or the exam administrator determines the characteristics of qualifying URLs for inclusion via properly configured regex settings, or the reference publisher identifies these characteristics for the exam software developer.

In another embodiment, where a large number of electronic resources are made available by the examining institution to examinees for viewing during an examination, the exam administrator can create a document providing an index and/or table of contents with one or more links to electronic resources within URL parameters specified to the software developer, whereas external links to other resources can be blocked or otherise prohibits such that they cannot be followed by an examinee during the examination. In other embodiments, certain external links may be allowed.

b). Hosting and Delivery

According to various embodiments, electronic document files can be stored on an internet-connected server hosted by or on behalf of the publisher, or by or on behalf of a second party, such as an academic institution, or hosted by the software developer. Firewall settings, other network security, and other general network settings are provided as specified, approved, and/or configured by the software developer.

c). Availability

According to various embodiments, the software developer can provide a tool, such as a website or client application, enabling exam administrators to identify specific web resources, such as those accessible through the array of URLs associated with one or more publishers or collections of local resources, to be available during exams for corresponding courses. Exam administrators may specify a time window when an exam will be taken, and the web resource or resources allowed can be available to examinees within the secure examination software client during that time window, or the time window could be extended or not specified.

In various embodiments, institutions can allow all examinees access to the complete list of resources on all exams, or can only allow access to the complete list on specified exams, or can show a partial list on specified exams.

According to various embodiments, the secure examination software of the present teachings can display web resources and documents in a window inside the software, such as in a secure web browser window. Further, in various embodiments, the secure examination software of the present teachings can protect such resources and documents by disabling export through save and print functions, as well as by blocking screen capture of the window.

d). User Experience

In accordance with various embodiments, examinees can find and select one or more correct (authorized) resource(s) for each exam, for example, by way of a pulldown list, pop-up menu, or the like, provided in the secure examination software program, for which exam administrators can set a descriptive name, such as a nickname, for each array of URLs reachable through a particular regex. For textbooks, the publishers' name(s) can be employed in situations where examinees would be familiar with this information through use of the resource during the preceding school term. For other electronic documents, such as in a collection of local resources hosted by the institution itself, the exam administrator can set suitable descriptive names, and can also provide a table of contents and/or other index to facilitate selection.

According to various embodiments, the secure exam software program of the present teachings can display web resources and documents in a window (e.g., a secure browser window) inside the software program. In some embodiments, when viewing electronic textbooks accessible through a publisher's ebook web application, examinees will have access to annotations and other notes as generally allowed by that application, so that if an institution wishes to disallow access to annotations, such can be arranged between the institution and the publisher. In various embodiments, when viewing local web resources posted by the institution, examinees can have access to the documents as posted.

e). Participation

According to various embodiments, it is contemplated that each of the parties performs actions and fulfill responsibilities for the system to operate:

Sotware Developers
    Build and maintain a data structure and server to:
    Record, store, and utilize URL parameters
    Record, store, and utilize course information, timing, and other parameters
    Create secure exam software INI files based on stored parameters
    Publish secure exam software for download over a network by examinees Publishers
    Allow participating institutions to use web resources in a predictable, reliable manner
    Communicate proactively with institutions and the software developer regarding any changes to access
    Support regular testing of the system Institutions
    Assess and specify which web resources to make available to which courses
    Maintain current information for accurate identification of URLs
    Be prepared to attach availability information to terms, courses, and resources Examinees
    Accept and be prepared to work with ebooks and other online resources in lieu of paper
    Produce and use personal notes external to the system, if required

II. CONSOLIDATED RESOURCES a). Document Formatting

Some existing ebook delivery tools, as typically operated by or on behalf of publishers, are standalone software applications or "clients", where effectively all resources are encrypted or otherwise protected by various "digital rights management" or "DRM" technology. The resources are typically organized in such a way that materials of the type expected to be allowed are segregated from materials and resources expected to be disallowed. However, as a matter of software programming and resulting usability, it may be difficult and perhaps infeasible in certain situations, to allow a standalone client to operate concurrently with exam software.

In order to bypass the use of concurrent clients, according to various embodiments, the method supplements these tools by creating one or more repositories of documents formatted and stored on one or more repository servers according to specified methods, which can be retrieved by the exam software inside a window or panel of the software itself.

In various embodiments, the formatting is standard text-based PDF with no encryption or DRM. If encryption is utilized, the software developer can provide a specification or tool to enable publishers to encrypt electronic textbooks before delivery, or may perform the encryption after delivery. In various embodiments, other formats can be supported, including ebook formats such as EPUB.

In various embodiments, an electronic reference document can include a table of contents with internal links, as well as internal links throughout the text, but external links to other resources are blocked or otherwise prohibited such that they cannot be followed, and the document can be entirely self-contained. In other embodiments, certain external links may be allowed.

Second- and third-party resource owners, such as institutions or publishers, can deliver formatted versions of electronic reference documents to one or more repository servers employing filename(s) of the institution or publisher's choice, and with accompanying metadata in a format such as a configuration file containing additional information about the document.

In accordance with various embodiments, an exemplary metadata file can be as follows:

```
[document]
Title=(freeform string title of textbook)
Version=(freeform string meaningful to publisher)
ReleaseDate=(yyyy/mm/dd hh:nn:ss)
Author=(comma separated list of authors)
Publisher=(freeform string identifying the publisher)
[control]
ExpirationDate=yyyy/dd/mm hh:nn:ss
[publisher]
SoftwareDeveloperID=(integer number to identify publisher in software
developer's system)
``` b). Hosting and Delivery

According to various embodiments, document files and their accompanying metadata files can be stored on a server hosted by the software developer or configured to an equivalent specification and hosted by or on behalf of a third party, such as a publisher, or by or on behalf of a second party, such as an academic institution. Files can be encrypted to the software developer's specification either on upload by the software developer's server, or in advance by using a separate application provided by the software developer specifically for the purpose. In various embodiments, firewall settings, other network security, and other general network settings are provided as specified, approved, and/or configured by the software developer.

According to various embodiments, the electronic document and metadata can be combined into a single file containing both sets of information and indexed according to the metadata within a data structure created by the software developer. The combined file can be delivered over a network via HTTPS or HTTP to authorized secure examination software clients upon proper request by software, which can then decrypt and display the document, such as in a secure browser window.

c). Availability

According to various embodiments, the software developer can provide a tool, such as a website or client application, enabling exam administrators to select specific resources to be available during exams for corresponding courses. In various embodiments, exam administrators can specify a time window when an exam can be taken, and the resource or resources can be made available to examinees within the secure examination software client during that time window, or the time window could be extended or not specified.

In various embodiments, the secure examination software program can download the resource in advance of the window, or retain the document past the window, but it will be stored locally in its encrypted form and only the client software will be able to decrypt it based on the availability window and course selection.

In various embodiments, the secure examination software can display resources in a window inside the software, such as via a secure web browser component, and protect them by disabling export through save and print functions, as well as by blocking screen capture of the window.

d). User Experience

In accordance with various embodiments, institutions wishing to make a particular resource available to examinees can do so on a per-course basis. The examinee will not need to know anything about the resource to access it during an exam. By selecting a course with one or more resources available and creating and editing an exam answer within the allowed availability window, the documents will simply be available within the secure examination software user interface.

According to various embodiments, the secure examination software program can display web resources and documents in a window inside the software, and only has access to the documents as posted. When viewing textbooks accessed through the consolidated resource collection, examinees will not have access to annotations and other notes as they would if using a publisher's ebook web application, so that if an institution wishes to allow access to annotations, such can be arranged between the institution and the examinee. When viewing local web resources posted by the institution, examinees will have access to the documents as posted.

e). Participation

According to various embodiments, it is contemplated that each of the parties performs actions and fulfill responsibilities for the system to operate:

Software Developer

Build and maintain a data structure and server to:

Receive, store and serve the encrypted documents

Record, store, and utilize course information, timing, and other parameters

Create secure examination software INI files based on stored parameters

Publish secure examination software for download over a network by examinees

Capture data on usage and produce suitable reports

Publishers

Deliver publications and corresponding metadata in appropriate formats

Trust the software developer and their partner institutions to safeguard their data Communicate proactively with institutions and the software developer regarding any changes to access Support regular testing of the system Institutions Assess and specify which web resources to make available to which courses Attach availability information to terms, courses and/or publications Optionally, attach individual examinees IDs to courses Examinees Accept and be prepared to work with ebooks and other online resources in lieu of paper Produce and use personal notes external to the system if required All references set forth herein are expressly incorporated by reference in their entireties for all purposes.

While the principles of the present teachings have been illustrated in relation to various exemplary embodiments shown and described herein, the principles of the present teachings are not limited thereto and include any modifications, alternatives, variations and/or equivalents thereof.

What is claimed is:

1. A system for securing a computing device during an open book testing event, comprising:

(1) a secure examination software program, comprising:
(a) an examination-taking component, and
(b) a web browser component; wherein the web browser component is configured:
(i) to locate and fetch a user-selected authorized reference work from one or more authorized reference work libraries hosted on one or more remote internet-connected servers; and
(ii) to render the contents of the fetched authorized reference work on a display of the computing device in a GUI window;
wherein the secure examination software program is embodied on a non-transitory computer-readable storage medium or stored/hosted on a hardware internet-connected server;
and, (2) a network access control module configured to block all network traffic to or from the computing device during the testing event as a default rule, with a specific exception permitting only traffic for accessing the one or more authorized reference work libraries recited in (1) (b) above; wherein the exception is configured by utilizing one or more regular expressions (regexes) to filter and allow network traffic associated with one or more URLs corresponding to the one or more authorized reference work libraries, thereby segregating traffic for materials to be disallowed.

2. The system of claim 1, further comprising an electronic configuration file, accessible by the secure examination software program, comprising the one or more regular expressions.

3. A system for securing a computing device during an open book testing event, the system comprising:

(1) an electronic configuration file comprising one or more regular expressions (regexes);
(2) a secure examination software program, executable by the computing device, comprising: (a) an examination-taking component, and (b) a web browser component; (i) wherein the electronic configuration file is disposed for access by the secure examination software program; and (ii) wherein the web browser component of the secure examination software program is configurable to locate and fetch one or more user-selected authorized reference works from one or more authorized reference work libraries hosted on one or more remote internet-connected servers, using regex-based URL filtering to distinguish authorized from unauthorized resources; and further (iii) wherein the secure examination software program is embodied on a non-transitory computer-readable storage medium or stored/hosted on a hardware internet-connected server; and, (3) a network access control module configured to block all network traffic to or from the computing device during the testing event as a default rule, with a specific exception permitting access to or from the one or more authorized reference work libraries recited in (2) (b) (ii) above, thereby segregating traffic for materials to be disallowed.

4. A system for securing a computing device during an open-book testing event, comprising:

(1) a secure examination software program, comprising:
(a) an examination-taking component; and
(b) a web browser component configured:
(i) to locate and fetch a user-selected authorized reference work from one or more authorized reference work libraries hosted on one or more remote Internet-connected servers; and
(ii) to render the contents of the fetched authorized reference work on a display of the computing device;
(2) an access control module associated with the secure examination software program and configured:
(a) to treat all attempted network requests originating from the computing device during the testing event as disallowed by default; and
(b) to permit those attempted network requests whose corresponding URLs or resource identifiers match one or more regular expressions (regexes), the one or more regular expressions defining authorized access to the one or more authorized reference work libraries; and
(3) wherein the secure examination software program is embodied on:
a non-transitory computer-readable storage medium or stored/hosted on a hardware internet-connected server.

5. The system of claim 4, further comprising an electronic configuration file, accessible to the secure examination software program, comprising the one or more regular expressions.

* * * * *